Dec. 12, 1950  M. C. HOLLEY  2,533,805
COMPOSITE PISTON RING
Filed Feb. 13, 1950
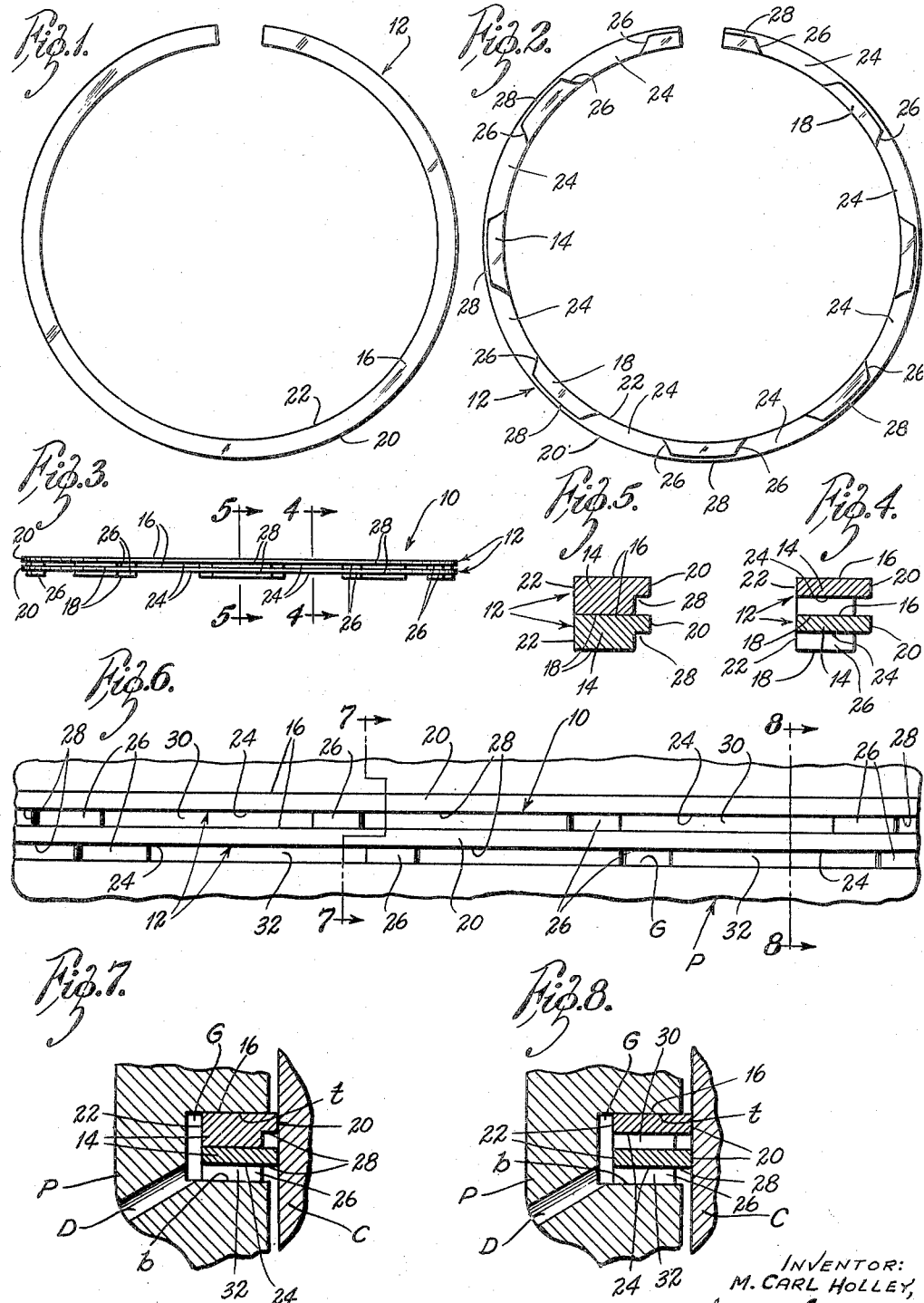
INVENTOR:
M. CARL HOLLEY,
BY George J. Mager,
HIS ATTORNEY.

Patented Dec. 12, 1950

2,533,805

UNITED STATES PATENT OFFICE 2,533,805

COMPOSITE PISTON RING

Majure Carl Holley, St. Louis County, Mo.

Application February 13, 1950, Serial No. 143,940

5 Claims. (Cl. 309—45)

The present invention relates generally to improvements in piston rings, and more particularly to a novel composite oil ring adapted for use without the employment of an expander.

Many improvements have been made heretofore in attempts to solve the problem of reducing the thickness of the oil film on cylinder walls, and at the same time prevent what is termed "blowby," or leakage of gas past the pistons, as is understood.

To this end, various types of oil rings ranging from single rings, with or without an expander element, to multiple ring assemblies, also with or without an expander element, have been designed.

However, although some of these rings and assemblies are very efficient in operation, the automotive industry is still in search of a better oil control ring both from the standpoint of increased efficiency, and reduced costs of manufacture.

In other words, the rings heretofore produced which rate more highly in operating performance, are also proportionately more expensive to manufacture. Conversely, the relatively less expensive type of ring has been found proportionately less efficient.

Further, none of these rings or ring assemblies are so constructed as to entirely eliminate clogging of the vents, or passages therein, through which the oil removed from the cylinder wall on the downstroke of the piston should drain back to the crankcase, as is understood.

The general objective of the instant invention is to provide a simple composite oil ring adapted to overcome the disadvantages mentioned above.

More particularly, it is an object of the invention to provide an oil ring composed of two cast iron rings, each split in the usual manner and identical in every respect, which when mounted in the oil groove of a piston without the use of an expander element, will more perfectly attain its intended purposes.

It is a further object of the invention to provide a composite ring which when installed in the oil groove of a piston, will result in the formation of an annular series of evenly spaced oil drain passages in an upper plane, and a similar series of passages in a lower plane, said passages being of a configuration, and normally occupying positions relative to others whereby clogging of them is obviated.

Another object is to provide an oil ring composed of a pair of counterpart cast iron ring members, the upper and lower faces of each member being machined or polished, so that horizontal movements of them relative to one another, and relative to the groove are facilitated.

Other features and advantages of this invention not particularly set forth above, will be apparent or specifically referred to in the description to follow, reference being had also to the accompanying drawing.

In said drawing:

Fig. 1 is a top plan view of one of a pair of identical cast iron rings comprising the present invention;

Fig. 2 is a bottom plan view thereof;

Fig. 3 is an edge, or side elevational view of the composite oil ring per se;

Figs. 4 and 5 are enlarged vertical sectional views taken on lines 4—4 and 5—5 respectively, of Fig. 3;

Fig. 6 is an enlarged, fragmentary elevational view of a piston, with the oil ring of the present invention installed thereon;

Figs. 7 and 8 are vertical sectional views taken respectively on lines 7—7 and 8—8 of Fig. 6, a portion of a cylinder wall being also shown in section.

In Figs. 3 and 6, the present invention is designated as a whole, by the reference numeral 10. It includes a pair of identical ring members 12, split in the conventional manner for installation, contraction, and expansion purposes, as is understood.

Each ring member 12 includes a body portion 14, an upper face portion 16, lower face portion 18, outer face portion 20, and an inner face portion 22. Preferably, the surfaces 16 and 18 are parallel and smooth. Likewise the outer and inner faces 20 and 22. The combined height of two ring members 12, when superimposed on one another, is obviously governed by the size of the oil groove in the type of piston for which they are designed. Obviously also, the circumferential size.

With particular reference now to Figs. 2 through 5, it is seen that the body portion 14 of each member 12 is recessed or notched as at 24, the recesses being preferably, but not necessarily, evenly spaced. The recesses 24 are preferably formed by means of a circular cutting tool, so that the vertical walls 26 which define each notch are arcuate, as shown. The notches are cut upwardly from the bottom surface 18 of each member 12 to a plane approximately on the horizontal centerline, as also shown in the drawing.

In order to provide uniformity in the thickness of the cylinder engaging, or outer face portion 20 of each ring, each segment of the body portion 14 thereof obtaining between the slots 24 is undercut or recessed as at 28. By this arrangement, all chatter that might develop from alternate wide and narrow segments of the ring reciprocating along the cylinder wall is prevented. It is noted in addition, that since the recesses or grooves 28 are in communication with the recesses 24, any oil stripped from the cylinder wall around the entire periphery of the rings has an unobstructed flow into the latter recesses, and thence via drain ports in the piston to the crankcase as will appear.

It is noted at this time, that the Fig. 3 portrayal of the invention does not represent the normal position which the members 12 occupy relative to one another when installed.

In other words, since the members 12 may move freely relative to one another during piston reciprocations, it may be said that the perfect alinement of recesses 24 and 28 as in Fig. 3 will seldom, if ever, obtain in practice.

For exemplary purposes, one of the numerous positions the members 12 may occupy relative to one another during reciprocations of a standard piston is illustrated in Fig. 6. The piston is only fragmentarily shown, and is designated P. The oil ring receiving groove therein, reference being also had to Figs. 7 and 8, is designated G.

All pistons of the type herein considered are provided with an annular series of ports for draining the stripped oil to the crankcase from the oil groove, as is well understood. In Figs. 7 and 8, typical drain ports are illustrated, being indicated by reference character D. In these views also, the wall defining the bottom of the groove G is designated by reference character b, the wall defining the top of said groove by reference character t, and a cylinder wall by C.

It should be evident from an inspection of Fig. 6 and the sectional views taken thereon, that when installed, the composite oil ring of this invention provides an upper annular series of oil draining passages 30, and therebelow, an annular series of oil draining passages 32.

As is apparent from the drawings, each of the drain passages or vents 30 in the upper series is defined by a pair of arcuate walls 26, a recess 24, and the upper face 16 of the member 12 therebelow. Each of the drain passages or vents 32 in the lower series is defined by a pair of arcuate walls 26, a recess 24, and the wall b of the oil groove G.

From the foregoing description, it should be manifest that my invention provides a novel composite oil ring which attains its objectives. It is noted that from a manufacturing standpoint alone, the invention has considerable merit in that the ring members 12 are duplicates. Mass production is therefore simplified, as is understood.

Clogging of the vents in known types of oil rings is still a major problem, as previously set forth. The present invention obviates clogging by reason of its novel construction. That is to say, the vents 30 and 32 are considerably larger than the more restricted vents found in rings of the prior art.

Further, the present invention provides two series of these vents at different elevations. No expander is required, and it is known that expanders, even though perforated or notched, do tend to restrict free bleeding of the oil to crankcase, with resultant clogging.

It is also noted that, as previously pointed out, the ring members 12 will move relative to one another during reciprocations of the piston. Such relative movements are particularly desirable in the present construction. To that end, the top and bottom faces, 16 and 18 respectively, are smooth so that friction between the walls b and t, as well as between the superimposed rings themselves, is reduced to a minimum. Thus it should be evident that oil and carbon formations which hamper the oil flow, or clog the vents of ordinary rings, is prevented.

Obviously, slight modifications in the construction illustrated and described may be made without departing from the scope of my invention as defined in the appended claims.

What I claim is:

1. In combination with the oil groove of a piston, a composite oil ring comprising a pair of identical split cast iron ring members superimposed one on the other in said groove, each of said ring members including a body having an upper and a lower face portion, an outer and an inner face portion, an annular series of spaced recesses formed in said body portion and extending upwardly from the lower face portion thereof, and an annular series of spaced recesses formed in said body and extending inwardly from the outer face portion thereof.

2. In combination with the oil groove of a piston, a composite oil ring comprising a pair of identical split cast iron ring members superimposed one on the other in said groove, each of said ring members including a body having an upper and a lower face portion, an outer and an inner face portion, an annular series of spaced recesses formed in said body portion and extending upwardly from the lower face portion thereof to a plane approximately on the horizontal centerline thereof, an annual series of spaced grooves formed in the outer face portion of said body, and a narrow cylinder-engaging band resulting from the formation of said recesses and said grooves.

3. The composite oil ring of claim 2 wherein the side walls defining each of said recesses extending upwardly from the lower face portion of each ring member are arcuately formed.

4. The composite oil ring of claim 2 wherein said upper and the lower faces of both ring members have a smooth finish.

5. A composite piston ring of the character described, comprising a pair of identical split cast iron ring members, each said ring member being provided with finished parallel top and bottom faces, finished parallel outer and inner faces, an annular series of evenly spaced radial recesses formed in the lower face and extending upwardly from the plane of said face to a plane approximately coincident with the horizontal centerline of said ring member, a series of evenly spaced solid segments obtaining between each pair of said recesses, and an arcuate groove formed in said outer face coextensive with each of said segments, said ring members being adapted for mounting in the oil groove of a standard piston in superimposed relation, with said recesses of each member opening downwardly.

M. CARL HOLLEY.

REFERENCES CITED

The following references are of record in the file of this patent:

UNITED STATES PATENTS

| Number | Name | Date |
|---|---|---|
| 2,250,062 | Hellman | July 22, 1941 |

FOREIGN PATENTS

| Number | Country | Date |
|---|---|---|
| 320,165 | Great Britain | of 1929 |
| 491,262 | Great Britain | of 1938 |
| 523,275 | Great Britain | of 1940 |